2,914,446

NITRITE STABILIZED ASCORBIC ACID-CYANO-COBALAMIN COMPOSITIONS

Lee H. Macdonald, Paw Paw Township, Van Buren County, Mich., assignor to The Upjohn Company, Kalamazoo, Mich., a corporation of Michigan No Drawing. Application June 26, 1958
Serial No. 744,642

5 Claims. (Cl. 167—81)

This invention relates to vitamin compositions stabilized against decomposition, and more particularly to vitamin compositions containing vitamin $B_{12}$ stabilized by the pressure of a stabilizing agent containing a nitrite moiety.

Vitamin $B_{12}$, or cyanocobalamin as it is named in The United States Pharmacopeia XV, is now a recognized nutritional factor and requisite for normal blood formation. It is a specific treatment for certain anemias and may be administered parenterally in solution or orally in tablet or liquid forms. In addition to compositions containing cyanocobalamin as the sole therapeutic ingredient it is desirable that cyanocobalamin be incorporated in a composition containing a plurality of other vitamins for prophylactic or therapeutic treatment of multiple vitamin deficiencies. The preparation of such a multiple vitamin composition confronts the art with the problem of reconciling the chemical incompatibility between cyanocobalamin and ascorbic acid. The art, prior to the present invention, has attempted to solve this problem and several partially satisfactory compositions have been announced. These compositions are: a sugar coated tablet wherein one vitamin is incorporated in the coating material and the other is placed in the core of the tablet; a liquid dispersion containing, in addition to the vitamins, a water-swellable montmorillonite clay; and a solution wherein the cyanocobalamin is converted to a cobalamin analogue by the addition of sodium bisulfite. It is apparent that of these compositions the first solves the problem only as to a solid oral form of medication; the second only as to an orally administered medication, and the third does not solve the problem of stabilizing cyanocobalamin in the presence of ascorbic acid, but instead presents a composition of a cobalamin analogue and ascorbic acid.

It is therefore an object of the present invention to provide a stable multiple vitamin composition containing cyanocobalamin and ascorbic acid. A further object is to provide a process of stabilizing cyanocobalamin to ascorbic acid in vitamin compositions in liquid or solid form. A still further object is to provide a cyanocobalamin stabilizing agent suitable for use in vitamin compositions for oral or parenteral use. Other objects will be apparent to one skilled in the art to which this invention pertains.

The foregoing and additional objects have been accomplished by the provision of a useful vitamin composition comprising cyanocobalamin, ascorbic acid, and a non-toxic stabilizing agent capable of providing a nitrite moiety.

The stabilizing agents used in the compositions of the present invention must have the following characteristics:

(1) Contains a nitrite (—ONO) moiety;
(2) Is sufficiently soluble to supply at least about 0.0005% by weight $NO_2$;
(3) Is not toxic and does not exhibit physiological activity per dosage unit when used in a concentration sufficient to supply the required amount of nitrite.

Among the stabilizing agents possessing the foregoing characteristics are the following: the alkali metal and alkaline earth nitrites, e.g., sodium nitrite, potassium nitrite, magnesium nitrite, and calcium nitrite; the alkyl nitrites, e.g., ethyl nitrite, amyl nitrite, octyl nitrite, propyl nitrite, and butyl nitrite; acid nitrites, e.g., nitrous acid. Because of its superior ability to fulfill the foregoing requirements and having the additional advantage of being economical, easily available, and convenience of use, sodium nitrite is preferred.

In general, the various compositions of the present invention contain from about 0.0005 percent to about 0.1 percent, by weight, of $NO_2$. For any particular composition the amount of stabilizing agent to be used is determined by (a) the particular nitrite used, and (b) the concentration of cyanocobalamin. For example, when sodium nitrite is used the amount would range from about 0.00075 percent to about 0.15 percent, by weight, said amounts supplying the desired 0.0005 to 0.1 percent of $NO_2$. Amyl nitrite from about 0.00127 to 0.255 percent or nitrous acid from about 0.0005 to 0.1 percent can also supply the desired concentration of $NO_2$. For the other agents, the amount to be used is easily calculated from their molecular weights. On the basis of a cyanocobalamin concentration of from about one to about ten micrograms per milliliter, about 0.005 percent of sodium nitrite (equivalent to about 0.0033 percent $NO_2$) is preferred. Compositions containing an increased amount of cyanocobalamin would contain a proportional increase in amount of stabilizing agent. For example, a concentration of about 1000 micrograms of cyanocobalamin per milliliter would contain about 0.1 percent of sodium nitrite.

In general, solutions would contain the stabilizing agent dissolved in the solvent, or in the case of a vitamin emulsion the stabilizing agent would be dissolved in the aqueous phase. Tablet formulations containing cyanocobalamin and ascorbic acid can be prepared and made more stable by dissolving the nitrite and cyanocobalamin in the granulating fluid.

The stabilizing agent can be effectively employed in soltuions in which the solvent system is partially or predominantly organic, so long as the solvent system remains capable of dissolving the stabilizer. For example, sodium nitrite can be used when glycerin, propylene glycol, mannitol, sorbitol, glucose, sucrose, and other sugars or polyols are part of the solvent system. It was unexpectedly found that the stability of cyanocobalamin in the presence of nitrite and ascorbic acid was enhanced when glycerin, in a concentration of about sixty percent or more, or propylene glycol, in a concentration of about fifty percent or more, was a part of the solvent system.

It was found that the pH of the solution modified the degree to which nitrite was effective in stabilizing cyanocobalamin in the presence of ascorbic acid. At a pH of about 3 to about 3.5 the stabilization was maximal.

Decreasing stability was observed as the pH was adjusted in either direction.

Aqueous multiple vitamin compositions of the present invention are prepared by dissolving cyanocobalamin, ascorbic acid, and the stabilizing agent in water. The solution can also have dissolved therein other vitamins of the water soluble group.

It is undesirable to have the cyanocobalamin and ascorbic acid dissolved in the solvent before the addition of the stabilizing agent, therefore it is a preferred procedure to either dissolve the cyanocobalamin and the stabilizing agent in one portion of the water and the ascorbic acid in another portion and then to mix the two solutions together, or, to first dissolve the cyanocobalamin and stabilizing agent in the solvent before the addition of the ascorbic acid.

When the composition is to take the form of a multiple vitamin emulsion, the equeous phase of the emulsion is prepared by the procedure followed in preparing the aqueous solutions. The fat soluble vitamins are dissolved in a vegetable oil and a suitable emulsifying agent added. The oil and aqueous solutions are mixed together and stirred until an emulsion is formed.

The pH of the aqueous solution or aqueous phase of the emulsion is adjusted to within the range of about pH 3 to about 3.5 by the addition of either hydrochloric acid or sodium hydroxide. Such adjustment takes place as the final step of the process. In many cases the pH will not have to be adjusted as the concentration of acidic vitamins, primarily the ascorbic acid, will give the composition a pH within the desired range. Hydrochloric acid is added to a composition having a pH larger than 3.5 and sodium hydroxide is added when the pH is less than 3.

When, in the preparation of multivitamin tablets, it is necessary to use a granulating fluid which is a solvent for ascorbic acid and cyanocobalamin, the cyanocobalamin and nitrite stabilizing agent are dissolved in the granulating fluid. The tablet granulation is then formed by the addition of the granulating fluid to the powder mixture containing ascorbic acid and the other vitamins.

A vitamin composition was prepared as described in Example 1 except that the sodium nitrite was omitted and cyanocobalamin was increased to a concentration of two micrograms per cubic centimeter. The composition was divided into eleven samples, two samples serving as controls and nine samples having various agents added. The nine samples with the added ingredients and one control were heated at 98 degrees centigrade for three and three-fourths hours, then all samples (including the unheated control) were assayed by the microbiological method described in The United States Pharmacopeia XV. The results are shown in Table I.

TABLE I

| Sample | Agent Added | Assay Result, Vitamin B$_{12}$, mg./cc. |
| --- | --- | --- |
| 1 | none, Control, unheated | 2 |
| 2 | none, Control, heated | 0.6 |
| 3 | Biotin, 0.1 mg./cc., heated | 0.6 |
| 4 | Sodium Metabisulfite, 2 mg./cc., heated | 1.3 |
| 5 | Sodium Nitrite, 2 mg./cc., heated | 1.5 |
| 6 | Sodium Nitrate, 2 mg./cc., heated | 0.6 |
| 7 | Wild Cherry Fluid Extract, NF. 2%, heated | 0.7 |
| 8 | Veegum R [1] 1.5%, heated | 1.0 |
| 9 | Sodium Cyanide, 5 mg./cc., heated | 1.2 |
| 10 | Cobalt Chloride, 5 mg./cc., heated | 0.9 |
| 11 | Protein Hydrolysate, 10 mg./cc., heated | 0.9 |

[1] Veegum is the trade name of the R. T. Vanderbilt Co. for a hydrated complex calcium, magnesium, aluminum silicate prepared from bentonite.

In order to compare the stabilizing effect of an organic nitrite with an inorganic nitrite, a vitamin composition similar to that described in Example 1 was prepared with the sodium nitrite being omitted from the formula. This composition then had about 3.5 micrograms/cc. of cyanocobalamin added and the composition divided into four samples. One of the samples had sodium nitrite in a concentration of about 0.005 percent added. Another sample had about 0.05 percent of amyl nitrite added. The two remaining samples had no stabilizer added and served as controls. Three of the samples were heated at 56 degrees centigrade for 96 hours, and the remaining control sample was cooled to five degrees centigrade during the heating period. All samples were then assayed for cyanocobalamin activity by microbiological method. The results are tabulated in Table II.

TABLE II

| | Sample | Vitamin B$_{12}$ Activity mcg./cc. |
| --- | --- | --- |
| 1 | Amyl nitrite, 0.05 percent | 2.6 |
| 2 | Control Sample (Heated) | 1.6 |
| 3 | Sodium nitrite, 0.005 percent | 3.2 |
| 4 | Control Sample (Not Heated) | 3.5 |

It appears that although amyl nitrite is effective in stabilizing cyanocobalamin in the presence of ascorbic acid, it is less so than sodium nitrite.

The mechanism whereby the cyanocobalamin is stabilized in the presence of ascorbic acid by nitrite is not known. However, it is known that it is not a metathetic mechanism whereby the cyanide moiety is replaced by the nitrite ion resulting in the formation of a cobalamin analogue.

In view of the report by Kaczka et al., in the J. Am. Chem. Soc. 73, 3569 (1951), describing the preparation of nitro-cobalamin by reaction of hydroxy-cobalamin with sodium nitrite and acetic acid, it seemed possible that some analogous displacement of the cyanide moiety of cyanocobalamin would take place upon the addition of sodium nitrite to an acidic solution of cyanocobalamin. A spectrophotometric study was undertaken to determine whether any such analogous displacement does take place.

The procedure used was as follows: two solutions of composition as shown in Table III were prepared in stoppered flasks and placed in an oil bath with an even temperature of seventy degrees centigrade; aliquots were withdrawn at intervals as indicated in Table III and the absorbance measured using a Cary Model 14 spectrophotometer. The results are tabulated in Table III.

TABLE III

Sample A contains 0.000028 molar cyanocobalamin and 0.0095 molar sodium nitrite in aqueous acetic acid with the pH of the solution being 3.5.

Sample B contains 0.0000365 molar cyanocobalamin in aqueous acetic acid with the pH of the solution being 3.25.

| Time | Sample A $\lambda 361$ absorbitivity | Sample B $\lambda 361$ absorbitivity |
| --- | --- | --- |
| 0 | 17.51 | 17.93 |
| 3-4 hours | 17.37 | 17.91 |
| 3 days | 17.77 | 17.89 |
| 7 days | 17.98 | 17.89 |
| 18 days | 17.75 | 17.61 |

It is thus evident, from the spectrophotometric study reported above, that no displacement of the cyanide moiety of cyanocobalamin by nitrite ion occurs.

The following examples are given by way of illustration only and are not to be construed as limiting.

Example 1

1000 cc. of the composition of the present invention are prepared from the following types and amounts of ingredients:

| Ingredient | Unit | Amount |
|---|---|---|
| Sodium nitrite | mg | 50 |
| Vitamin A palmitate | gm | 5.55 |
| Vitamin D₃ | mg | 42 |
| Corn oil | gm | 6.4 |
| Riboflavin | gm | 1.66 |
| Thiamine hydrochloride | gm | 1.66 |
| Pantothenyl alcohol | gm | 5 |
| Nicotinamide | gm | 16.66 |
| Pyridoxine hydrochloride | gm | 1.66 |
| Ascorbic acid | gm | 83.33 |
| Cyanocobalamin | mg | 1.66 |
| Emulsifying agent | gm | 11 |
| Saccharin sodium | gm | 0.5 |
| Preservative | gm | 1 |
| Flavor | gm | 3 |
| Glycerin | cc | 600 |
| Propylene glycol | cc | 40 |
| Deionized water, q.s. ad | cc | 1000 |

The riboflavin, thiamine hydrochloride, pantothenyl alcohol, nicotinamide, pyridoxine hydrochloride, and saccharin sodium are dissolved in 240 cc. of deionized water. The cyanocobalamin and sodium nitrite are dissolved in ten cubic centimeters of water and added to the first solution. The preservatives and flavors are dissolved in the propylene glycol and glycerin and added to the aqueous solution. The vitamin A palmitate, vitamin D₃ and emulsifying agent are mixed with the corn oil and added to the aqueous solution. Additional deionized water is added to make 1000 cubic centimeters and the mixture stirred until a uniform emulsion results.

Example 2

1000 cc. of the composition of the present invention are prepared from the following types and amounts of ingredients:

| Ingredient | Unit | Amount |
|---|---|---|
| Thiamine hydrochloride | gram | 0.2 |
| Riboflavin | do | 0.2 |
| Pantothenyl alcohol | do | 0.5 |
| Nicotinamide | do | 1.0 |
| Pyridoxine hydrochloride | do | 0.05 |
| Folic acid | do | 0.05 |
| Ascorbic acid | do | 10.0 |
| Cyanocobalamin | do | 0.0005 |
| Ferrous gluconate | do | 6.0 |
| Ethyl nitrite | do | 0.05 |
| Saccharin sodium | do | 0.1 |
| Preservative | do | 1.0 |
| Flavor | do | 3.0 |
| Sorbitol, 70% solution | cc | 650 |
| Deionized water, q.s. ad. | cc | 1000 |
| Hydrochloric acid, q.s. | | |

The sorbitol (70%) solution is heated to seventy degrees centigrade and the ferrous gluconate added and stirred until dissolved. The solution is allowed to cool to room temperature and the ascorbic acid is added and stirred until dissolved. The sodium nitrite, cyanocobalamin, thiamine hydrochloride, riboflavin, pantothenyl alcohol, nicotinamide, pyridoxine hydrochloride, folic acid, and saccharin sodium are added to 250 cc. of deionized water and the mixture stirred until dissolved. The two solutions are mixed together and the flavor and preservative added. Additional deionized water is added to make up a volume of 1000 cc. The pH is adjusted to within the range of 3 to 3.5 by the addition of hydrochloric acid.

Example 3

1000 cc. of the present invention are prepared from the following types and amounts of ingredients:

| Ingredient | Unit | Amount |
|---|---|---|
| Nitrous acid | gram | 0.05 |
| Cyanocobalamin | do | 0.005 |
| Riboflavin | do | 3.5 |
| Nicotinamide | do | 50 |
| Thiamine hydrochloride | do | 12.5 |
| Pyridoxine hydrochloride | do | 1.5 |
| d-Pantothenyl alcohol | do | 15 |
| Ascorbic acid | do | 75 |
| Phenol | do | 4.0 |
| Water for injection (air free by nitrogen), q.s. | cc | 1000 |

Boil about 1200 cc. of water for injection for ten minutes with nitrogen gas passing through it. Cool the water rapidly to about twenty degrees centigrade under an atmosphere of nitrogen. In about 9000 cc. of the water, dissolve the above ingredients in the order named. Stir until dissolved, keeping the solution air free by means of a nitrogen atmosphere. Filter with a suitable glass filter of ultra fine porosity into suitable glass containers.

Example 4

1000 tablets of the composition of the present invention are prepared from the following types and amounts of ingredients:

| Ingredient | Unit | Amount |
|---|---|---|
| Thiamine hydrochloride | grams | 12.5 |
| Riboflavin | do | 10.5 |
| Pyridoxine hydrochloride | do | 2.2 |
| Dextro calcium pantothenate | do | 24 |
| Nicotinamide | do | 105 |
| Folic acid | do | 1.75 |
| Ascorbic acid | do | 150 |
| Cyanocobalamin | do | 0.005 |
| Sodium nitrite | do | 0.05 |
| Calcium stearate powder | do | 35 |
| Sucrose (50% w./v.) aqueous solution | cc | 25 |

The cyanocobalamin and sodium nitrite are dissolved in the sucrose solution. The remaining vitamin powders are mixed together and a granulation formed by adding the sucrose solution, mixing, forcing through a screen, and drying. The calcium stearate is mixed with the dry granules and the mixture pressed into tablets.

Example 5

1000 cc. of the present invention are prepared from the following types and amounts of ingredients:

| Ingredient | Unit | Amount |
|---|---|---|
| Sodium nitrite | gram | 1 |
| Cyanocobalamin | do | 1 |
| Ascorbic acid | do | 75 |
| Deionized water, q.s. ad | cc | 1000 |

The sodium nitrite and cyanocobalamin are dissolved in about 100 cc. of the water. In the remaining water dissolve the ascorbic acid and mix the two solutions together.

It is to be understood that the invention is not to be limited to the exact details of operation or exact compositions shown and described, as obvious modifications and equivalents will be apparent to one skilled in the art, and the invention is therefore to be limited only by the scope of the appended claims.

What is claimed is:

1. A vitamin composition comprising cyanocobalamin and ascorbic acid as therapeutic ingredients and a nitrite, said nitrite being present in a concentration equivalent to from about 0.0005 to about 0.1 percent by weight of $NO_2$ of said composition.

2. The composition of claim 1 having a pH of from about 3 to about 3.5.

3. A vitamin composition comprising cyanocobalamin and ascorbic acid as therapeutic ingredients and sodium nitrite, said sodium nitrite being present in a concentration equivalent to from about 0.0005 to about 0.1 percent by weight of $NO_2$ of said composition.

4. The composition of claim 3 having a pH of from about 3 to about 3.5.

5. A vitamin composition comprising an oil-in-water emulsion having a pH of from about 3 to about 3.5 and a plurality of oil soluble and water soluble vitamins, including cyanocobalamin and ascorbic acid, and about 0.005 percent of sodium nitrite.

References Cited in the file of this patent

FOREIGN PATENTS 698,624     Great Britain _____ Oct. 21, 1953

OTHER REFERENCES

Prier: Arch. of Biochem. and Biophysics, vol. 40, No. 2, October 1952, pp. 474–476.

Stapert: Jour. of the Am. Pharmaceutical Asso., vol. 43, No. 2, February 1954, p. 87.